United States Patent
Hill et al.

(10) Patent No.: US 7,936,867 B1
(45) Date of Patent: May 3, 2011

(54) MULTI-SERVICE REQUEST WITHIN A CONTACT CENTER

(75) Inventors: Deborah Jeanne Hill, Broomfield, CO (US); Sarah Hildebrandt Kiefhaber, Longmont, CO (US); Joylee E. Kohler, Northglenn, CO (US); Henry R. Paddock, Boulder, CO (US); Katherine A. Sobus, Wilmington (DE); Rodney A. Thomson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1248 days.

(21) Appl. No.: 11/464,737

(22) Filed: Aug. 15, 2006

(51) Int. Cl.
*H04M 3/00* (2006.01)
(52) U.S. Cl. ......... 379/265.12; 379/265.09; 379/265.13; 379/265.11; 379/266.02
(58) Field of Classification Search ............... 379/265.1, 379/265.11, 265.12, 265.05, 266.01, 265.09, 379/265.13, 266.02
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,311,422 A | 5/1994 | Loftin et al. |
| 5,325,292 A | 6/1994 | Crockett |

(Continued)

FOREIGN PATENT DOCUMENTS

CA 2143198 1/1995

(Continued)

OTHER PUBLICATIONS

U.S. Appl. No. 10/815,566, filed Mar. 31, 2004, Kiefhaber.

(Continued)

*Primary Examiner* — Ahmad F Matar
*Assistant Examiner* — Antim Shah
(74) *Attorney, Agent, or Firm* — Sheridan Ross P.C.

(57) ABSTRACT

A contact center that includes:
(a) an input 200 operable to receive a contact;
(b) a task expert module 232 to (i) identify a plurality of tasks 400 associated with the contact; (ii) group the tasks 400 into first and second task sets; and (iii) queue the first and second task sets at different positions in at least one queue 208; and
(c) an agent and work item selector 220 to assign the first task set to a first agent for servicing while maintaining the second task set in the at least one queue 208.

25 Claims, 8 Drawing Sheets

U.S. PATENT DOCUMENTS

| | | |
|---|---|---|
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,784,452 A | 7/1998 | Carney |
| 5,787,410 A | 7/1998 | McMahon |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | McNerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,408,066 B1 * | 6/2002 | Andruska et al. ........ 379/265.12 |
| 6,408,277 B1 | 6/2002 | Nelken |

| Patent | Date | Name |
|---|---|---|
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Pertrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,556,974 B1 | 4/2003 | D'Alessandro |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,563,921 B1 | 5/2003 | Williams et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 | 9/2003 | Flockhart et al. |
| 6,650,748 B1 | 11/2003 | Edwards et al. |
| 6,668,167 B2 | 12/2003 | McDowell et al. |
| 6,675,168 B2 | 1/2004 | Shapiro et al. |
| 6,684,192 B2 | 1/2004 | Honarvar et al. |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,724,885 B1 | 4/2004 | Deutsch et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,775,377 B2 | 8/2004 | McIllwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,915,305 B2 | 7/2005 | Subramanian et al. |
| 6,947,543 B2 | 9/2005 | Alvarado et al. |
| 6,947,988 B1 | 9/2005 | Saleh |
| 6,963,826 B2 | 11/2005 | Hanaman et al. |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 | 5/2006 | Borodow et al. |
| 7,054,434 B2 | 5/2006 | Rodenbusch et al. |
| 7,062,031 B2 | 6/2006 | Becerra et al. |
| 7,076,051 B2 | 7/2006 | Brown et al. |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,127,058 B2 | 10/2006 | O'Connor et al. |
| 7,136,873 B2 | 11/2006 | Smith et al. |
| 7,149,733 B2 | 12/2006 | Lin et al. |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et al. |
| 7,215,744 B2 | 5/2007 | Scherer |
| 7,222,075 B2 | 5/2007 | Petrushin |
| 7,246,371 B2 | 7/2007 | Diacakis et al. |
| 7,257,513 B2 | 8/2007 | Lilly |
| 7,257,597 B1 | 8/2007 | Pryce et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,324,954 B2 | 1/2008 | Calderaro et al. |
| 7,336,779 B2 | 2/2008 | Boyer et al. |
| 7,340,408 B1 | 3/2008 | Drew et al. |
| 7,373,341 B2 | 5/2008 | Polo-Malouvier |
| 7,376,127 B2 | 5/2008 | Hepworth et al. |
| 7,392,402 B2 | 6/2008 | Suzuki |
| 7,409,423 B2 | 8/2008 | Horvitz et al. |
| 7,415,417 B2 | 8/2008 | Boyer et al. |
| 7,418,093 B2 | 8/2008 | Knott et al. |
| 7,499,844 B2 | 3/2009 | Whitman, Jr. |
| 7,500,241 B1 | 3/2009 | Flockhart et al. |
| 7,526,440 B2 | 4/2009 | Walker et al. |
| 7,545,925 B2 | 6/2009 | Williams |
| 7,567,653 B1 | 7/2009 | Michaelis |
| 7,734,032 B1 | 6/2010 | Kiefhaber et al. |
| 2001/0011228 A1 | 8/2001 | Shenkman |
| 2001/0034628 A1 | 10/2001 | Eder |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0123923 A1 | 9/2002 | Manganaris et al. |
| 2002/0147730 A1 | 10/2002 | Kohno |
| 2003/0028621 A1 | 2/2003 | Furlong et al. |
| 2003/0073440 A1 | 4/2003 | Mukherjee et al. |
| 2003/0093465 A1 | 5/2003 | Flockhart et al. |
| 2003/0108186 A1 | 6/2003 | Brown et al. |
| 2003/0144900 A1 | 7/2003 | Whitmer |
| 2003/0144959 A1 | 7/2003 | Makita |
| 2003/0231757 A1 | 12/2003 | Harkreader et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0102940 A1 | 5/2004 | Lendermann et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2004/0240659 A1 | 12/2004 | Gagle et al. |
| 2004/0249650 A1 | 12/2004 | Freedman et al. |
| 2004/0260706 A1 | 12/2004 | Anonsen et al. |
| 2005/0021529 A1 | 1/2005 | Hodson et al. |
| 2005/0044375 A1 | 2/2005 | Paatero et al. |
| 2005/0049911 A1 | 3/2005 | Engelking et al. |
| 2005/0071211 A1 | 3/2005 | Flockhart et al. |

| | | | |
|---|---|---|---|
| 2005/0071212 | A1 | 3/2005 | Flockhart et al. |
| 2005/0071241 | A1 | 3/2005 | Flockhart et al. |
| 2005/0071844 | A1 | 3/2005 | Flockhart et al. |
| 2005/0091071 | A1 | 4/2005 | Lee |
| 2005/0125432 | A1 | 6/2005 | Lin et al. |
| 2005/0125458 | A1 | 6/2005 | Sutherland et al. |
| 2005/0138064 | A1 | 6/2005 | Trappen et al. |
| 2005/0154708 | A1 | 7/2005 | Sun |
| 2005/0182784 | A1 | 8/2005 | Trappen et al. |
| 2005/0283393 | A1 | 12/2005 | White et al. |
| 2005/0289446 | A1 | 12/2005 | Moncsko et al. |
| 2006/0004686 | A1 | 1/2006 | Molnar et al. |
| 2006/0007916 | A1 | 1/2006 | Jones et al. |
| 2006/0015388 | A1 | 1/2006 | Flockhart et al. |
| 2006/0026049 | A1 | 2/2006 | Joseph et al. |
| 2006/0056598 | A1 | 3/2006 | Brandt et al. |
| 2006/0100973 | A1 | 5/2006 | McMaster et al. |
| 2006/0135058 | A1 | 6/2006 | Karabinis |
| 2006/0178994 | A1 | 8/2006 | Stolfo et al. |
| 2006/0242160 | A1 | 10/2006 | Kanchwalla et al. |
| 2006/0256957 | A1 | 11/2006 | Fain et al. |
| 2006/0271418 | A1 | 11/2006 | Hackbarth et al. |
| 2007/0038632 | A1 | 2/2007 | Engstrom |
| 2007/0064912 | A1 | 3/2007 | Kagan et al. |
| 2007/0083572 | A1 | 4/2007 | Bland et al. |
| 2007/0112953 | A1 | 5/2007 | Barnett |
| 2007/0127643 | A1 | 6/2007 | Keagy |
| 2007/0192414 | A1 | 8/2007 | Chen et al. |
| 2007/0201311 | A1 | 8/2007 | Olson |
| 2007/0201674 | A1 | 8/2007 | Annadata et al. |
| 2007/0230681 | A1 | 10/2007 | Boyer et al. |
| 2008/0056165 | A1 | 3/2008 | Petrovykh |
| 2009/0193050 | A1 | 7/2009 | Olson |

FOREIGN PATENT DOCUMENTS

| | | |
|---|---|---|
| CA | 2174762 | 6/1995 |
| EP | 0501189 | 9/1992 |
| EP | 0740450 | 10/1996 |
| EP | 0770967 | 5/1997 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 0899673 | 3/1999 |
| EP | 0998108 | 5/2000 |
| EP | 1035718 | 9/2000 |
| EP | 1091307 | 4/2001 |
| EP | 1150236 | 10/2001 |
| GB | 2273418 | 6/1994 |
| GB | 2290192 | 12/1995 |
| JP | 2001-053843 | 2/2001 |
| JP | 2002-304313 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 00/26804 | 5/2000 |
| WO | WO 00/26816 | 5/2000 |
| WO | WO 01/80094 | 10/2001 |
| WO | WO 02/099640 | 12/2002 |
| WO | 03/015425 A2 | 2/2003 |

OTHER PUBLICATIONS

U.S. Appl. No. 10/815,584, filed Mar. 31, 2004, Kiefhaber.
U.S. Appl. No. 10/861,193, filed Jun. 3, 2004, Flockhart et al.
U.S. Appl. No. 10/946,638, filed Sep. 20, 2004, Flockhart et al.
U.S. Appl. No. 11/199,828, filed Aug. 8, 2005, Bland et al.
U.S. Appl. No. 11/242,687, filed Oct. 3, 2005, Krimstock et al.
U.S. Appl. No. 11/245,724, filed Oct. 6, 2005, Flockhart et al.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick et al.
U.S. Appl. No. 12/242,916, filed Oct. 1, 2008, Kiefhaber et al.
"Call Center Recording for Call Center Quality Assurance", Voice Print International, Inc., available at http://www.voiceprintonline. com/call-center-recording.asp?ad_src=google&srch_trm=call_center_monitoring, date unknown, printed May 10, 2007, 2 pages.
"KANA—Contact Center Support", available at http://www.kana.com/solutions.php?tid=46, copyright 2006, 3 pages.
"Monitoring: OneSight Call Statistics Monitors", available at http://www.empirix.com/default.asp?action=article&ID=301, date unknown, printed May 10, 2007, 2 pages.
"Oracle and Siebel" Oracle, available at http://www.oracle.com/siebel/index.html, date unknown, printed May 10, 2007, 2 pages.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
"Still Leaving It to Fate?: Optimizing Workforce Management", Durr, William Jr., Nov. 2001.
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.
"eGain's Commerce 2000 Platform Sets New Standard for eCommerce Customer Communications," Business Wire (Nov. 15, 1999), 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.
Andy Zmolek; "SIMPLE and Presence: Enterprise Value Propositions," Avaya presentation, 16 pages, presented Jan. 24, 2002.
Aspect—"Analysis and Reporting," http://aspect.com/products/analysis/index.cfm, (Copyright 2005) (1page).
Aspect—"Call Center Reports," http://aspect.com/products/analysis/ccreporting.cfm, (Copyright 2005) (2 pages).
Aspect—"Performance Optimization," http://aspect.com/products/wfm/performanceopt.cfm?section=performanceopt, (Copyright 2005) (1page).
Atkins et al; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).

Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
Avaya—"Basic Call Management System Reporting Desktop," Product Overview, http://www.avaya.com/gcm/master-usa/en-s/products/offers/bcmrs_desktop.htm (Copyright 2005) (2 pages).
Avaya—"Basic Call Management System Reporting Desktop," Product Technical, http://www.avaya.com/gcm/master-usa/en-us/products/offers/bcmrs_desktop.htm (Copyright 2005) (2 pages).
Avaya—"Call Management System," Product Description, http://www.avaya.com/gcm/master-usa/en-us/products/offers/call_management_system.htm (Copyright 2005) (2 pages).
Avaya—"Call Management System," Product Features, http://www.avaya.com/gcm/master-usa/en-us/products/offers/call_management_system.htm (Copyright 2005) (3 pages).
Avaya—"Call Management System," Product Overview, http://www.avaya.com/gcm/master-usa/en-us/products/offers/call_management_system.htm (Copyright 2005) (2 pages).
Avaya—"Call Management System," Product Technical, http://www.avaya.com/gcm/master-usa/en-us/products/offers/call_management_system.htm (Copyright 2005) (2 pages).
Avaya—"Multi Channel Product Authorization," (PA) Version 5.0, (Nov. 2003) (6 pages).
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Background of the Invention for the above-captioned application (previously provided).
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Berners-Lee et al.; "Uniform Resource Identifiers (URI); Generic Syntax," Network Working Group, Request for Comments 2396 (Aug. 1998), 38 pages.
Bill Michael, "The Politics of Naming" www.cConvergence.com (Jul. 2001) pp. 31-35.
Bischoff et al. "Data Ware House Building Method—practical advices telled by persons having experience and experts", Kyouritsu Shuppan Corp. May 30, 2000, first edition, pp. 197-216.
Chavez, David, et al., "Avaya MultiVantage Software: Adapting Proven Call Processing for the Transition to Converged IP Networks," Avaya, Inc., Aug. 2002.
Cherry, "Anger Management," IEEE Spectrum (Apr. 2005) (1 page).
Coles, Scott, "A Guide for Ensuring Service Quality in IP Voice Networks," Avaya, Inc., 2002, pp. 1-17.
Songini, "ETL QuickStudy," ComputerWorld, accessed at http://www.computerworld.com/databasetopics/businessintelligence/datawarehouse/story/..., copyright 2005, 5 pages.
Creating and Using Data Warehouse Dimension Tables (Microsoft) copyright 2005, http://msdn.microsoft.com/library/en-us/createdw/createdw_10kz.asp?frame=true, 3 pages.
Creating and Using Data Warehouse-Using Dimensional Modeling (Microsoft) downloaded May 18, 2005 http://msdn.microsoft.com/library/en-us/createdw/createdw_39z.asp?frame=true 1 page.
Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.
"CS 345: Topics in Data Warehousing," Oct. 5, 2004, 36 pages.
Data Warehouse—Surrogate Keys, Keep Control Over Record Identifiers by Generating New Keys for the Data Warehouse, Ralph Kimball, May 1998, 4 pages.

Data Warehouse Designer—Design Constraints and Unavoidable Realities, No design Problem in School was This Hard, Ralph Kimball, Sep. 3, 2002, 3 pages.
Data Warehouse Designer—An Engineer's View—Its' Worthwhile to Remind Ourselves Why We Build Data Warehouses the Way We Do, Ralph Kimball, Jul. 26, 2002, 3 pages.
Data Warehouse Designer—Divide and Conquer, Build Your Data Warehouse One Piece at a Time, Ralph Kimball, Oct. 30, 2002, 3 pages.
Data Warehouse Designer—TCO Starts with the End User, Ralph Kimball, May 13, 2003, http://www.intelligententerprise.com/030513/608warehouse1_1.jhtml?_requestid=598425, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Three: Handling Time, Ralph Kimball, Apr. 22, 2003, 3 pages.
Data Warehouse Designer—The Soul of the Data Warehouse, Part Two: Drilling Across, Ralph Kimball, Apr. 5, 2003, 3 pages.
Data Warehouse Designer—Two Powerful Ideas, The Foundation for Modern Data Warehousing, Ralph Kimball, Sep. 17, 2002, 3 pages.
Data Warehouse Designer Fact Tables and Dimension, Jan. 1, 2003, http://www.inteeigententerprise.com/030101/602warehouse1_1.jhtml, Ralph Kimball, 3 page.
Dawson et al.; "Vcard MIME Directory Profile," Network Working Group (Sep. 1998), available at http://www.ietf.org/rfc/rfc2426.txt?number=2426, 40 pages.
Dawson, "NPRI's Powerguide, Software Overview" Call Center Magazine (Jun. 1993), p. 85.
Day et al.; "A Model for Presence and Instant Messaging," Network Working Group (Feb. 2000), available at http://www.ietf.org/rfc/rfc2778.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
DEFINITY Communications System Generic 3 Call Vectoring/Expert Agent Selection (EAS) Guide, AT&T publication No. 555-230-520 (Issue 3, Nov. 1993).
Dillion, "Renaming fields and tracing dependencies", available at http://allenbrowne.com/ser-41.html, Nov. 2003, updated May 2006, 1 page.
DMReview—Business Dimensional Modeling: The Logical Next Step: Translating the BDM, Laura Reeves, published May 2004, 4 pages.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, 1999, 8 pages.
E. Veerman, "Designing a Dimensional Model", date unknown, 38 pages.
Fielding et al.; "Hypertext Transfer Protocol—HTTP/1.1," Network Working Group, Request for Comments 2068 (Jan. 1997), 152 pages.
Foster, Robin, et al., "Avaya Business Advocate and its Relationship to Multi-Site Load Balancing Applications," Avaya, Inc., Mar. 2002, 14 pages.
Fundamentals of Data Warehousing—Unit 3—Dimensional Modeling, Fundamentals of Data Warehousing, copyright 2005—Evolve Computer Solutions, 55 pages.
G. Hellstrom et al., "RFC 2793—RTP Payload for Text Consersation," Network Working Group Request for Comments 2793 (May 2000), available at http://www.faqs.org/rfcs/rfc2793.html, 8 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
G. Wiederhold, "Mediation to Deal with Heterogeneous Data Sources", Stanford University, Jan. 1999, 19 pages.

GEOTEL Communications Corporation Web site printout entitled "Intelligent CallRouter" Optimizing the Interaction Between Customers and Answering Resources., 1998, 6 pages.
Glossary—Curlingstone Publishing, http://www.curlingstone.com/7002/7002glossary.html, downloaded May 24, 2005, 11 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/r1c2833.html, 23 pages.
Holtman et al.; "HTTP Remote Variant Selection Algorithm—RVSA/1.0," Network Working Group (Mar. 1998), available at http://wvw.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Intelligent Enterprise Magazine—Data Warehouse Designer: Fact Tables and Dimension, downloaded May 18, 2005, http://www.intelligententerprise.com/030101/602warehouse1_1.jhtml, 7 pages.
J. Cahoon, "Fast Development of a Data Warehouse Using MOF, CWM and Code Generation", CubeModel, May 22, 2006, 32 pages.
Bentley, "Metadata: Everyone Talks About It, But What Is It?" Proceedings of the Twenty-Sixth Annual SAS Users Group International Conference: SAS Institute Inc., 2001, Paper 125-26, 5 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
Kimball, et al., "Practical Techniques for Extracting, Cleaning, Conforming, and Delivering Data." The Data Warehouse ETL Toolkit. 2004. Ch. 5, pp. 170-174.
Kimball, et al., "The Complete Guide to Dimensional Modeling." The Data Warehouse Toolkit. 2nd Edition, 2002. Ch. 11, pp. 240-241.
Koutarou, "Building a Framework for EC using Hibernate, OSWorkflow", JAVA Press, Japan, Gujutsu Hyouron Company, vol. 25, 2004, pp. 132-147.
L. Cabibbo et al., "An Architecture for Data Warehousing Supporting Data Independence And Interdperability", International Journal of Cooperative Information Systems, Nov. 2004, 41 pages.
Lamel et al., "Language Identification Using Phone-Based Acoustic Likelihood," IEEE International Conference on Acoustics, Speech, and Signal Processing, 1994, vol. 1, pp. 293-296.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
Microsoft Office Animated Help Tool, date unknown, 1 page.
Microsoft R Access 97 for Windows R Application development guide, Ver. 8.0, Microsoft Corp., a first version, pp. 569-599.
MIT Project Oxygen, Pervasive, Human-Centered Computing (MIT Laboratory for Computer Science) (Jun. 2000) pp. 1-15.
Multi-Dimensional Modeling with BW ASAP for BW Accelerator Business Information Warehouse, copyright 2000, 71 pages.
NICE Systems—"Insight from Interactions," "Overwhelmed by the Amount of Data at your Contact Center?" http://www.nice.com/products/multimedia/analyzer.php, (Printed May 19, 2005) (2 pages).
NICE Systems—"Multimedia Interaction Products," "Insight from Interactions," http://www.nice.com/products/multimedia/contact_centers.php (Printed May 19, 2005) (3 pages).
Nortel—"Centrex Internet Enabled Call Centers," http://www.products.nortel.com/go/product_assoc.jsp?segld=0&parID=0&catID=-9191&rend_id... (Copyright 1999-2005) (1page).
Presentation by Victor Zue, The MIT Oxygen Project, MIT Laboratory for Computer Science (Apr. 25-26, 2000) 9 pages.
Richard Shockey, "ENUM: Phone Numbers Meet the Net" www.cConvergence.com (Jul. 2001) pp. 21-30.
Rose et al..; "The APEX Presence Service," Network Working Group (Jan. 14, 2002), available at http://www.ietf.org/internet-drafts/draft-ietf-apex-presence-06.txt, 31 pages.
Sarda, "Temporal Issues in Data Warehouse Systems", 1999, Database Applications in Non-Traditional Environments (DANTE'99), S. 27, DOI: 10.1109/DANTE.1999.844938.
Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.
Snape, James, "Time Dimension and Time Zones." 2004. pp. 1-10. http://www.jamessnape.me.uk/blog/CommentView,gui,79e910a1-0150-4452-bda3-e98d.
Stevenson et al.; "Name Resolution in Network and Systems Management Environments"; http://netman.cit.buffalo.edu/Doc/DStevenson/NR-NMSE.html; printed Mar. 31, 2003; 16 pages.
Sugano et al., "Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.
Thayer Watkins, "Cost Benefit Analysis", 1999, San Jose State University Economics Department, Web Archive http://web.archive.org/web/19990225143131/http://www.sjsu.edu/faculty/watkins/cba.htm.
Akitsu, "An Introduction of Run Time Library for C Program, the fourth round," C Magazine, Jul. 1, 1990, vol. 2(7), pp. 78-83.
Emura, "Windows API Utilization Guide, Points for Knowledges and Technologies," C Magazine, Oct. 1, 2005, vol. 17(10), pp. 147-150.
Examiner's Office Letter (including translation) for Japanese Patent Application No. 2007-043414, mailed Jul. 7, 2010.
Moss et al., "The Importance of Data Modeling as a Foundation for Business Insight," copyright 2004, 38 pages.

* cited by examiner

900

Name : [ John Smith ] — 904

How can we help you today?

908 — ☐ New Membership
912 — ☒ Billing
916 — ☒ Travel
920 — ☒ Insurance
924 — ☐ Other Customer Service Related Issues?

*Fig. 9*

MULTI-SERVICE REQUEST WITHIN A CONTACT CENTER

FIELD OF THE INVENTION

The invention relates generally to contact centers and particularly to servicing incoming contacts in contact centers.

BACKGROUND OF THE INVENTION

Customer contacts of a business enterprise can take various forms, and be for substantially any reason. Such contacts with the business enterprise may be in the form of face-to-face interactions at a premises for the enterprise, a telephony contact for interaction with enterprise resources (e.g., customer contact personnel, automated processes, or some combination thereof), interactive on-line sessions such as Internet chat sessions via an enterprise website, email, facsimile, etc. Moreover, when a customer contacts such an enterprise, the customer may have only a vague understanding of what the customer desires, and/or the customer may not know what enterprise tasks must be performed to fulfill each of the customer's requests. Accordingly, it frequently occurs that upon determining the requests and the enterprise tasks that must be performed to satisfy the requests of the customer, different enterprise resources are required (or best suited) to process different collections of the tasks. For example, a customer may contact the contact center to do more than one transaction (e.g., open a checking account and apply for a loan), with each transaction being performed by a different resource. In general, such requests and/or tasks are scheduled sequentially; that is, a first request or task is assigned to a first enterprise resource for completion, and once the first request or task is completed, a second request or task is entered into a queue (or other data structure) for assignment to a second enterprise resource or transferred directly to the second resource, and once the second request or task is completed by the second enterprise resource, a third request or task is entered into another queue (or other data structure) for assignment to a third enterprise resource or transferred directly to the third resource, etc. In fact, most contact centers assign tasks to contact center personnel (e.g., agents or other resources) in this fashion.

Such scheduling of customer requests and/or tasks is inefficient and/or problematic for both the customer and the enterprise for a number of reasons.

First, this type of scheduling can lead to work duplication and/or unnecessary use of enterprise resources. For example, a multi-skilled agent may be able to service multiple requests and/or tasks simultaneously. By queuing the requests and/or tasks sequentially, the ability to use such a multi-skilled agent to service multiple requests and/or tasks is frequently unrecognized by the contact center routing algorithm. If the allocation of enterprise resources is performed request-by-request, then neither the customer nor the resource may have sufficient information when performing a first of the enterprise requests and/or tasks to also perform a second of the requests and/or tasks. Thus, to complete the second request and/or task, the customer is likely to have to wait for this second corresponding task to be reassigned to the resource (or its equivalent). For example, requesting to exchange of a product for a different product, and requesting to purchase a service plan on a second product. The exchange likely entails the tasks of: (a) determining the appropriateness of the exchange, (b) arranging for the return of the product the customer currently has, and (c) providing the customer with information about alternative products. It may be that an agent from a first group of agents is able to handle (a) and (b), and an agent from a second group of agents is specifically trained for return product processing. Additionally, it may be that agents skilled in completing a service plan purchase are in a third group which can if necessary also handle customer requests for tasks of types (a) and (b). Accordingly, if tasks are scheduled sequentially in the order listed above, then the customer may likely be transferred to three different agents.

When a customer request(s) requires more than one enterprise resource to fulfill the request(s), then it is typical that a customer is only scheduled for interacting with a second resource once a customer interaction with a first enterprise resource has completed. Thus, even though a contact's associated request(s)/task(s) performed by each of the first and second resources may be independent of one another, the contact is only entered into only one queue (or other data structure) at a time for assignment to enterprise resources. Thus, the customer can experience substantial wait times between resources.

Some contact center product offerings allow a call to queue in multiple splits/skills but once a customer's call has been answered by one skill, the call is removed from all other queues. For example, if a customer needed to have three different requests handled, the customer would generally have to select one and then tell the answering agent about the additional needs. This often results in the customer being transferred to another agent, which is inefficient for the customer and the enterprise. Additionally, some product offerings support a workflow capability, which allows work to proceed through a number of tasks. This capability requires a predefined order for those tasks to occur in.

In general, there is no automated capability for uniformly expediting a customer contact having multiple requests or having one request that requires multiple skills for successful servicing, particularly when the collection of skills cannot be serviced by a single multi-skilled agent.

SUMMARY OF THE INVENTION

These and other needs are addressed by the various embodiments and configurations of the present invention. The present invention is directed to concurrent queuing of parts or components of a contact in different queues or in different positions in the same queue.

In a first embodiment of the present invention, a method for servicing work items is provided that includes the steps of:
 (a) receiving a contact;
 (b) identifying a plurality of tasks associated with the contact;
 (c) grouping the tasks into first and second (or more) task sets;
 (d) queuing the first and second task sets at different positions in one or more queues; and
 (e) assigning the first task set to a first agent for servicing while maintaining the second task set in a queue.

As used herein, a "request" refers to a contact purpose, contact intent, customer need, customer problem, and/or other basis for customer assistance (e.g., transaction or interaction between the customer and contact center) associated with the contact; "task" refers to an action, occurrence, and/or event which is required for the request to be serviced, precedent to servicing of the request, or is otherwise part of the request servicing activity; and "task set" refers to a grouping of one or more tasks that require or otherwise relate to a common skill and/or queue.

In another embodiment, a database or repository for tracking task set servicing hierarchies is provided that includes sets of data structures, each set of data structures defining a corresponding work item skill queue. Each set of data structures defines a plurality of queue positions in the corresponding skill queue, with each queue position being associated with a different work item. In the data structures, first and second queues include first and second work items in first and second queue positions, respectively. The first and second work items correspond to first and second task sets, respectively, and to a common contact, and first and second subsets of data structures define the first and second work items. Each of the subsets of data structures includes a dependency field defining a servicing hierarchy for the first and second work items. The dependency field of the first work item has a different value than a dependency field of the second work item indicating that the first work item is to be serviced before the second work item.

The first subset of data structures can include a pointer to the second subset of data structures and vice versa, and each of the first and second subsets of data structures can include a pointer to the common contact.

The data structures permit multiple requests or task sets to be queued simultaneously, allowing the customer to retain his or her position in queue for the other requests while one of the requests is being serviced.

The present invention can allow the customer to specify multiple problems that need to be serviced and to notify both the servicing resource that the customer is queued in other queues once the customer has been delivered to the servicing resource and the servicing resource of the customer's position in other queues as that position changes. The invention can identify the servicing resources that can handle multiple requests from the customer and attempt to route to those servicing resources in preference to servicing resources handling fewer of the service requests. It can allow for the maintenance of queue position to a servicing resource once the customer has reached the top or head of the queue, if the customer is already being serviced by another servicing resource, so that the customer will be the next serviced in that queue once the customer has disconnected from the current servicing resource.

The contact center of the present invention can provide enterprises with a way to manage effectively customer requests involving tasks of multiple skills. Notwithstanding the fact that the customer's request(s) involve tasks of various skills, the present architecture allows the tasks in the contact to be identified and routed to a single multi-skilled agent or a number of single-skill agents serially without the contact needing to be requeued after each single-skill agent services his or her tasks in the contact. Rather, the various task sets of the contact are queued simultaneously and remain queued even when one of the task sets is being serviced. This ability can provide enhanced customer satisfaction through better understanding and addressing of customer needs and more efficient and effective contact center operation through identifying a contact's various task sets and assigning a common multi-skilled resource to handle those requests. The ability addresses all of the needs of the customer and allows efficient handling of those needs. The contact center can also direct the order in which the customer accomplishes tasks, according to the needs of the business process. For example, the tasks that need to be completed first before other tasks can be performed can be marked or flagged as having priority over the other tasks in the contact and processed by the contact preferentially.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 9 is a screen shot of a graphical user interface according to an embodiment of the present invention.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

The present disclosure describes a customer contact system (FIG. 1) for more effectively and efficiently handling customer (or potential customer) requests and/or enquiries received by an enterprise, such as a business or merchant whose customers request services related to products and/or services sold (or available to be sold) by the business or merchant. In particular, such an enterprise may be substantially any for profit endeavor or non-profit endeavor. Additionally, such an enterprise may be a public service, governmental or military organization such as the U.S. Internal Revenue Service, a public service Internet-based medical condition treatment referral site, a military recruitment unit, etc.

Note that in describing the customer contact system, the term "customer" as used herein denotes both established customers as well as potential customers, and the term "customer contact" (or merely, "contact") includes enterprise contacts by a customer related to a customer request, and/or a customer inquiry. The contact can be by any modality, whether packet-switched or circuit-switched. Moreover, the term "customer request" (or merely "request") as used herein denotes both requests and inquiries by both previous customers as well as potential new customers.

The resources of the contact center can be human or automated. The enterprise resources may thus be human agents, software "intelligent" agents (e.g., designed to automatically handle specific customer requests), or hybrid combinations of human agents and software agents.

Figure 1:
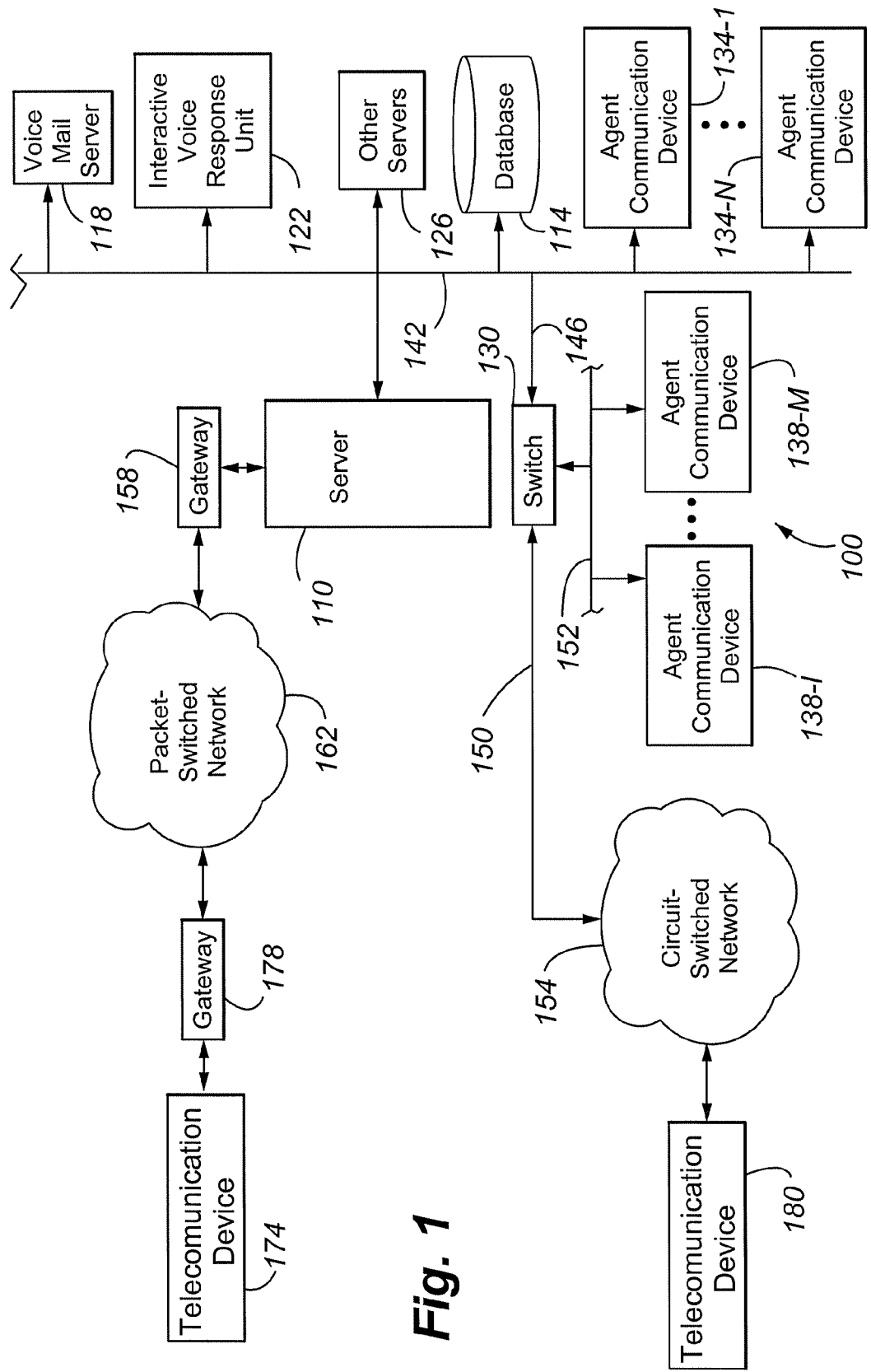
FIG. 1 is a block diagram depicting a contact center according to an embodiment of the present invention.

FIG. 1 shows an illustrative embodiment of the present invention. A contact center 100 comprises a central server 110, a set of data stores or databases 114, and a plurality of servers, namely a voice mail server 118, an Interactive Voice Response unit or IVR 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network. LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server and the like. The switch 130 is connected via a plurality of trunks 150 to the Public Switch Communication Network or PSTN 154 and via link(s) 152 to the second communication devices 138-1 to M. A gateway 158 is positioned between the server 110 and the packet-switched network 162 to process communications passing between the server 110 and the network 162.

Although the preferred embodiment is discussed with reference to a client-server architecture, it is to be understood that the principles of the present invention apply to other network architectures. For example, the invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the invention does not require the presence of packet- or circuit-switched networks.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
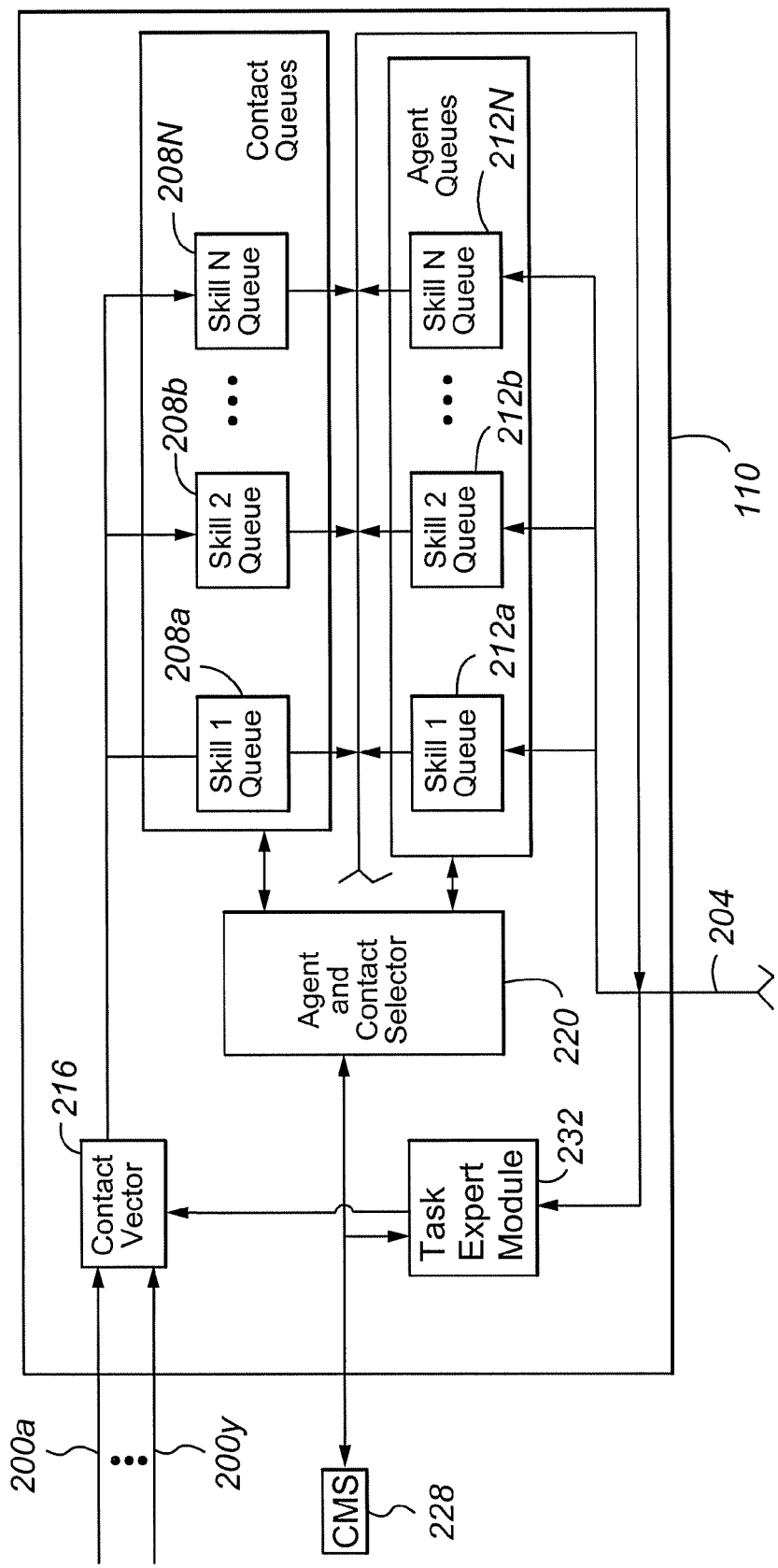
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Basic Call Management System™ or BCMS and a Call Management System™ or CMS that gathers call records and contact-center statistics for use in generating contact-center reports. CMS and BCMS and any other reporting system, such as Operational Analyst™ or Customer Call Routing™ or CCR™ will hereinafter be referred to jointly as CMS 228.

The switch 130 and/or server 110 can be any architecture for directing contacts to one or more communication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, Customer Relationship Management or CRM Central 2000 Server™, Communication Manager™, S8300™ media server, SIP Enabled Services™, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced communication devices. Other types of known switches and servers are well known in the art and therefore not described in detail herein.

Referring to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are queued in individual ones of the contact queues 208a-n in their order of priority or are queued in different ones of a plurality of contact queues that correspond to a different priority. Likewise, each agent's skills are prioritized according to his or her level of expertise in that skill, and either agents are queued in individual ones of agent queues 212a-n in their order of expertise level or are queued in different ones of a plurality of agent queues 212a-n that correspond to a skill and each one of which corresponds to a different expertise level.

Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels.

Referring again to FIG. 1, the database 114 may contain a variety of enterprise information. For example, the database 114 can include contact- or customer-related information, such as customer name, customer contact information, customer financial information, customer transaction history, customer class or type, account number, and the like, agent- or agent-related information, such as agent name, agent state, agent skill(s) and/or skill level(s), agent queue associations, and the like, contact center current and historic performance information, and other information that can enhance the value and efficiency of the contact processing. The database 114 may have its data configured according to a relational database architecture, an object oriented database architecture, or configured for access by another type of database architecture. Additionally, the data repository or storage may be simply a collection of one or more data files, wherein the data therein may be ordered or unordered.

The gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, SIP hardphones, SIP softphones, packet-based voice messaging and response units, packet-based traditional computer telephony adjuncts, peer-to-peer based communication devices, and any other communication device.

The second communication devices 138-1, . . . 138-M are time division multiplexed and/or circuit-switched. Each of the communication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional communication device endpoints serviced by the switch/server, and the switch/server can direct incoming calls to and receive outgoing calls from these extensions in a conventional manner. The second communication devices can include, for example, wired and wireless telephones, PDAs, H.320 video phones and conferencing units, voice messaging and response units, traditional computer telephony adjuncts, and any other communication device.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" in that they are not directly supported as communication device endpoints by the switch or server. The communication devices 174 and 180 are an example of devices more generally referred to herein as "external endpoints."

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the server 110 forwards instructions to the switch 130, which in turn forwards instructions to the component to forward or route the contact to a specific contact center resource, such as the IVR unit 122, the voice mail server 118, and/or first or second communication device 134, 138 associated with a selected agent. The server 110 distributes and connects these contacts to communication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110 and information respecting agent servicing of the contacts is stored in the database 114.

According to the invention, an agent and contact selector 220 and task expert module 232 are provided. The modules are stored either in the main memory or in a peripheral memory (e.g., disk, CD ROM, etc.) or some other computer-readable medium of the center 100. The agent and contact selector 220 assigns available agents to contacts in the queues 208. The task expert module 232 maps a request of customers to the request's component task(s), determines task performance dependencies between the component tasks, and forms the tasks into task sets, which are then queued in the contact queues 208 depending on the agent skill needed to service the task sets. Normally, each task set will correspond to one skill. Thus, a request or set of requests associated with an incoming contact can have multiple corresponding task sets in multiple differing queues.

Figures 3, 4:
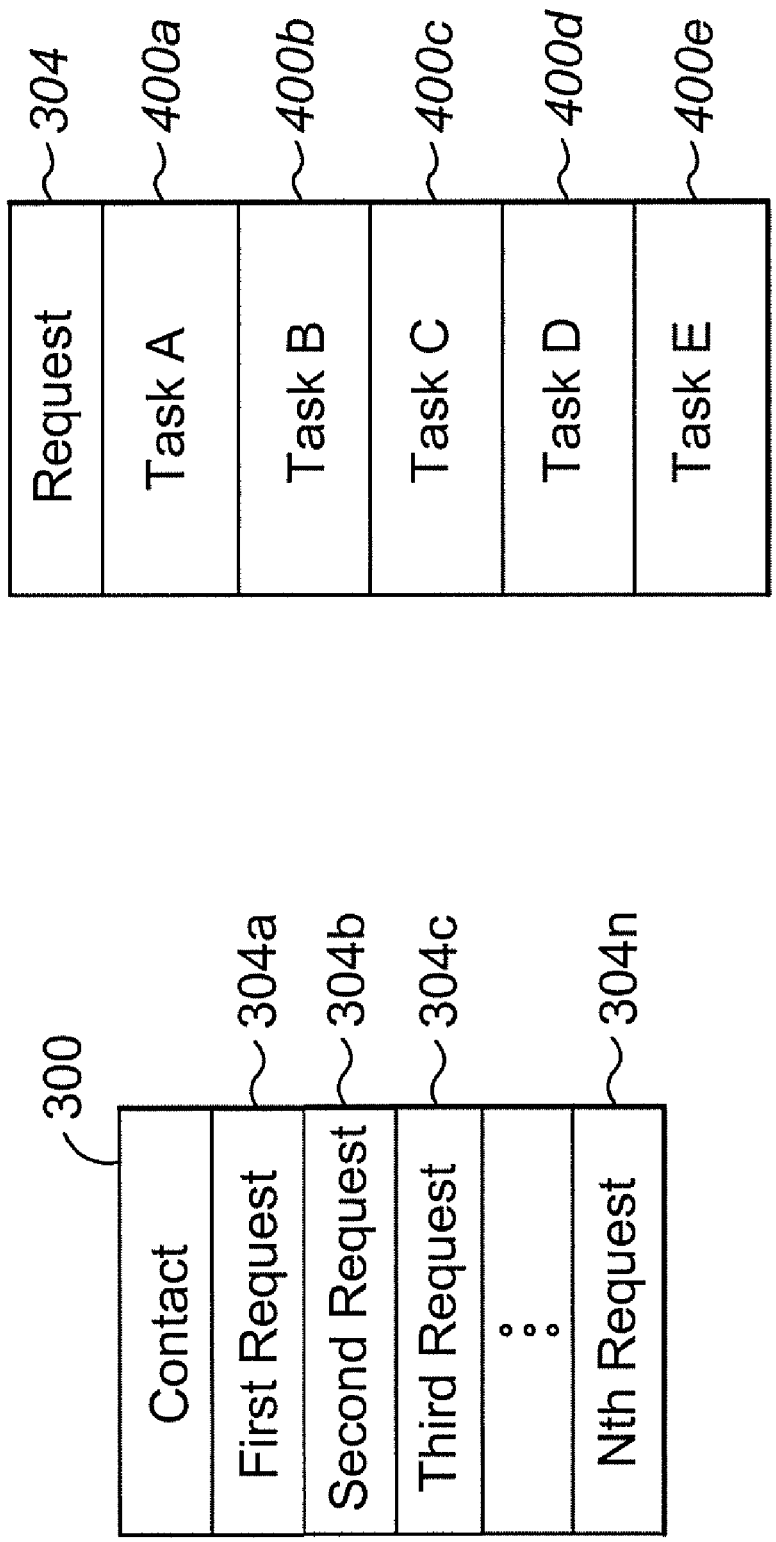
FIG. 3 is prior art and depicts a contact comprising a number of component requests.
FIG. 4 is prior art and depicts a request comprising a number of component enterprise tasks.

Before discussing further the operation of the task expert module, it is important to describe the request/task/task set paradigm in greater detail with reference to FIGS. 3-6. Referring to FIG. 3, a contact 300 is depicted that has first, second, third, . . . nth customer requests 304*a-n*. A request typically relates to a transaction. For example, a customer can contact, via a Web browser, a Web server of the contact center of a financial institution to open up a savings and/or checking account and apply for a line of credit or other type of loan. Opening up the account and applying for the line of credit are considered to be separate requests. With reference to FIG. 4, a request 304 is depicted having a number of component tasks 400*a-e*. The tasks are actions or events that must take place for the transaction corresponding to the request in order to be completed. For example when the request is to receive a home loan, the tasks would be to verify the identity of the customer/applicant (task A), receive and process a loan application from the customer/applicant (task B), receive and process a net worth statement of the customer/applicant (task C), obtain and analyze the credit report of the customer/applicant (task D), obtain title insurance for the residence of the customer/applicant (task E), employment verification (task F) (not shown), and obtain and analyze an appraisal of the residence (task G) (not shown). Following the completion of these tasks, the loan can be approved. As can be seen from this example, each task can further have sub-tasks, such as for task B, verifying that the completed loan application is complete and submission of the completed loan application to the loan approval committee.

Figures 5, 6:
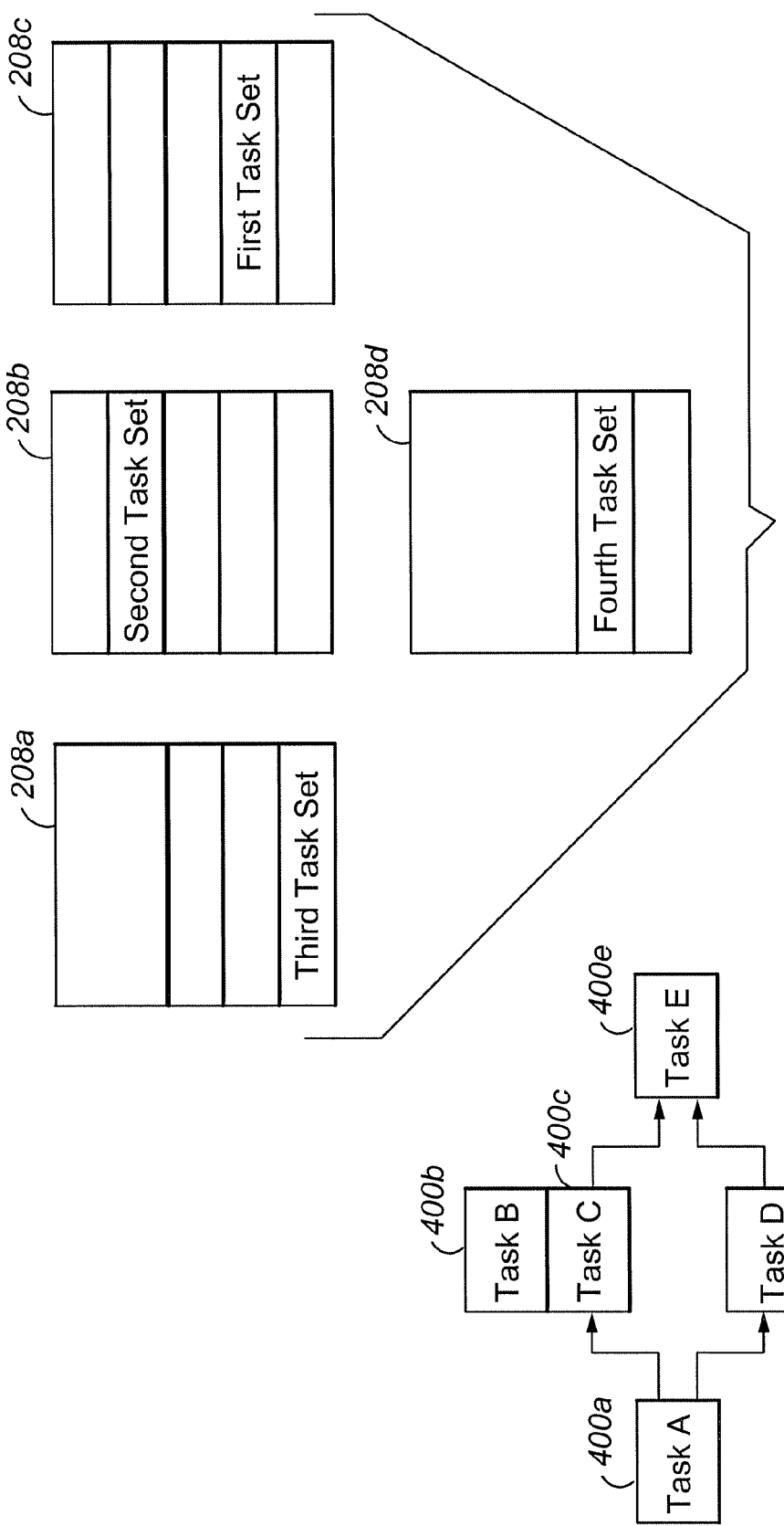
FIG. 5 is prior art and depicts the hierarchical structure of enterprise tasks.
FIG. 6 depicts a number of contact queues according to an embodiment of the present invention.

The various tasks often have a performance hierarchy that must be followed for effective completion of the request. With reference to FIG. 5, task A must be performed before Tasks B, C, D, and E can be performed, and tasks B, C, and D must be performed before task E can be performed. For example, in the example above the identity of the customer must be verified before the ensuing tasks can be performed.

Additionally, the tasks can be grouped into sets depending on the agent skill required to perform the task(s). The task sets are commonly defined by the skill required to perform the members of the task set. Thus, the members of each task set commonly require a common skill for them to be serviced. With reference to FIG. 5, task A, which corresponds to a first task set, requires a first skill to be serviced, tasks B and C, which correspond to a second task set, require a second skill to be serviced, task D, which corresponds to a third task set, requires a third skill to be serviced, and task E, which corresponds to a fourth task set, requires a fourth skill to be serviced. As can be seen from FIG. 5, the second and third task sets can be performed in parallel, or concurrently, either together by a multi-skilled agent having the second and third skills, or individually by different agents, who have only a respective one of the second and third skills.

By dividing requests into tasks and grouping tasks into task sets, the task expert module 232 can provide for more effective scheduling for task servicing. With reference to FIG. 6, four skill queues are depicted, namely first skill queue 208a, second skill queue 208b, third skill queue 208c, and fourth skill queue 208d. Each skill queue has a number of queue positions, each skill position representing a set of data structures associated with a corresponding contact and/or task set. For example, the first skill queue 208a has three queue positions, the second and third queues 208b and c five queue positions, and the fourth skill queue 208d two queue positions. As can be seen, each of the queues is queuing a different one of the first, second, third and fourth task sets at varying queue positions. In other words, the contact effectively is queued, simultaneously, in multiple skill queues. The task sets normally progress at different rates through a corresponding queue towards the head of the corresponding queue. Referring to the example of FIG. 5, if a dependent task set, such as the third or fourth task set, reaches the head of the corresponding first or fourth queue 208a before the first task set in the third queue 208c is completely serviced, the agents logged into the first and fourth queues 208a and 208d are unable to service the third and fourth task sets, respectively. In that situation, the third task set is held at the head of the queue until such time as servicing of the first task set is completed. At that time, the third task set is delivered to an agent for servicing. As will be appreciated, if a multi-skilled agent is logged into the first, third, and fourth queues 208a, c, and d, the first, third, and fourth task sets can be delivered concurrently to the same agent for servicing. Conversely while the first task set is being serviced by an agent, the second task set, which is in a less advanced queue position, holds its queue position and continues to advance towards the head of the queue unhindered by the status of the first task set.

The queue position data structures corresponding to each of the task sets reference, or point to, the customer contact with which they are associated, reference, or point to, the other task sets associated with the contact, and include a dependency field indicating the relative order in which the task set is to be performed. For example, the dependency field of the first task set has a value of zero as its performance is independent of the performance of the other task sets, the dependency fields of the second and third task sets each have a value of one meaning that each must be performed after the first task set, while the fourth dependency field of the fourth task set has a value of two meaning that it must be performed after the first, second, and third task sets. As each related task set is completed, it is marked in the data structures of the contact and/or the related, pending task sets as having been completed. At this point, the hierarchical ordering may be adjusted. For example, if a pending task set has a dependency field value of "1" and the precursor task set is completed, the dependency field value of the pending task set may be changed to "0". Alternatively, the dependency field value may remain unaltered, and the selector 220 will determine the completed status of the precursor task set by examining the data structures associated with the contact and/or completed task set.

The operations of the task expert module 232 and agent and contact selector 220 will now be discussed with reference to FIGS. 7A and 7B.

In box 700, a work item, such as a contact, arrives at the contact center for servicing by one or more contact center resources. The work item includes one or more requests from the customer.

In step 704, the needs, or requests, of the customer and any additional request, including corporate and pending requests, are identified. A corporate request refers to a request that is an aggregate of a number of other requests. For example, a corporate request would be a request to finance an investment real estate purchase, which necessarily requires the applicant to apply for and receive a second mortgage on the applicant's home as the required down payment. The various component requests of a corporate request are identified. A pending request refers to another contact of the customer, such as an email, that is queued and waiting service. It is beneficial to the contact center to group all requests of the customer together and service them as part of the same set of transactions.

Step 704 can be performed by any suitable enterprise resource, with an automated response unit, such as the IVR 122, being the most commonly used resource. FIG. 9 depicts an exemplary screen shot 900 of a graphical user interface provided to the customer during a Web-based contact. As can be seen from FIG. 9, a name field 904 is provided for customer name (which may be populated automatically by mapping the source address information received from the customer against customer records) and a plurality of request fields 908, 912, 916, 920, and 924 for capturing the request(s) engendered by the contact. As can be seen from FIG. 9, the customer has already checked fields 912 (billing), 916 (travel), and 920 (insurance) as corresponding to separate requests to be made to the contact center. As will be appreciated, the request fields 908, 912, 916, 920, and 924 each map to a corresponding skill and skill queue 208a-n. As discussed below, the contact center, if possible, will attempt to match the multi-skilled request with a multi-skilled agent for servicing.

In step 708, the task expert module 232 accesses the set of requests identified for the work item, maps each request to its corresponding component tasks using a "best fit" analysis, and groups the tasks into skill-based task sets also based on a "best fit" analysis, and determines and marks the dependencies among the identified task sets. The mapping is typically performed by characterizing each request into one of a predetermined set of request types, e.g., open a savings account, open a checking account, apply for a home loan, apply for a line of credit, and the like. Each predetermined request type has a corresponding grouping of tasks. "Best fit" matching in the mapping of the customer's requests to predetermined requests is typically done based on key word matching. The grouping of tasks into skill-based task sets is based on a "best fit" mapping between the tasks and the skills of the various contact queues. As will be appreciated, tasks corresponding to differing requests in the same work item can be grouped together as part of the same task set. In one configuration, the association of tasks with a corresponding skill is a predetermined mapping that enables, once the customer request is mapped to a corresponding predetermined request type, a rapid and predetermined grouping of tasks from one or more requests into appropriate skill-based task sets.

In decision diamond 712, the task expert module 232 determines whether each of the individual tasks defined by the contact requests can be completed within a predetermined period of time. For example, the task expert module 232 accesses selected information from CMS 228, such as agent staffing levels and/or queue lengths or sizes for each skill associated with the identified tasks for the contact, actual, expected, and/or predicted wait times for the work item queues, and, based on the information, determines whether the various tasks can be completed within the predetermined time period.

When one or more of the individual tasks cannot be completed in a timely manner, the task expert module 232 in decision diamond 716 determines whether or not processing of the contact should continue. This can be determined based on the reason for the untimely completion and/or by notifying the customer of the contact center state (e.g., expected wait time) and/or what requests or component tasks the contact center can and/or cannot complete currently and querying the customer making the contact whether or not he or she is willing to wait the needed time to complete all of the tasks. An example of the former reason is there are currently no agents having the skills available to service one or more of the tasks. The agents could be on break or off duty. An example of the latter is where the contact center has a heavy call volume at the current time and is experiencing long wait times. The contact center may wish to discourage customers from waiting or, due to the high value of the customer, to appease the customer by warning of the long wait times and offering a suitable alternative to current service. A suitable alternative could be, for example, a scheduled call back by the contact center. When the contact is not to be continued in decision diamond 716, the agent and contact selector 220, in step 748, dequeues all remaining task(s), if any, associated with the contact and the contact is disconnected.

When all of the tasks can be completed within the predetermined time period (decision diamond 712) or at least one task cannot be completed in a timely manner, but the contact is to be continued (decision diamond 716), the task expert module 232, in step 720, instructs the vector 216 to queue the various task sets in appropriate queues and mark the dependency relationships in the queued data structures representing the various task sets. In step 724, the agent and contact selector 220 waits for an available resource. The various queued task sets then progress towards the head of their respective queues. In the event that the customer disconnects while awaiting service, the agent and contact selector 220 proceeds to step 748.

When a suitably skilled resource (e.g., agent) becomes available in step 728, all task sets that the available selected resource can service are delivered to the agent. Other task sets that are not being handled by the resource remain queued. The contact is marked as "busy". Nonetheless, the undelivered task sets associated with the contact continue to progress towards the head of their respective queues.

In step 732, when the resource is finished with the delivered task sets, the task expert module 232 re-evaluates the task set(s) and dependencies based on information received by the resource when servicing of the delivered task set(s) has completed. The contact is again marked as "not busy". As will be appreciated, the contact center will know when the resource is finished servicing the delivered task set(s) by resource feedback, such as receipt a completed signal from the resource after the resource has completed wrap up, the receipt of a contact processing request from the resource (e.g., a request to again place the contact on hold), and/or by analysis of the data entered by the agent when servicing the task set(s). In any event, the data structures associated with the customer and the contact are updated to reflect the information entered by the resource. This is important as other agents may need to have access to this information when servicing dependent task set(s).

Re-evaluation of the dependencies as parts (task sets) of the contact are serviced can be important to effective and efficient contact center operation. For example, it may be that a task set no longer needs to be serviced because the customer has elected to drop or alter the request associated with that task set or because that customer request was able to be serviced by the resource even though the skill needed to service the request was not a primary skill of the resource. Conversely, the customer, after being serviced by a resource, may have elected to make further requests that cause the generation of additional task set(s). The additional task set(s) may have further dependency relationships with previously queued task set(s) associated with the same contact. These dependency relationships need to be considered. Thus, the queue data structures associated with the existing and new task sets will need to be altered to reflect the existence of the other task sets and the order in which they are to be serviced.

In decision diamond 736, the agent and contact selector 220 determines whether all task sets for the selected customer contact have been completed. When one or more task sets remain to be serviced, the selector 220, in decision diamond 744, determines whether the remaining task set(s) can be serviced within the predetermined time period. If not, the selector offers the customer the options noted above with respect to decision diamond 716 and, in step 748, dequeues the remaining task set(s). If the remaining task set(s) can be serviced within the predetermined time period, the selector returns to and repeats step 724.

When all of the task set(s) for the selected customer contact have been completed, the selector 220, in step 740, causes CMS 228 or other reporting device to generate a customer contact report. This step normally simply means that any unreported data collected by various agents in servicing the contact is reported to the database 114 and appropriate updates made to the data structures associated with the selected contact and the customer associated with that contact.

Finally, after step 752, any remaining task set(s) are dequeued in step 748.

Figure 8:
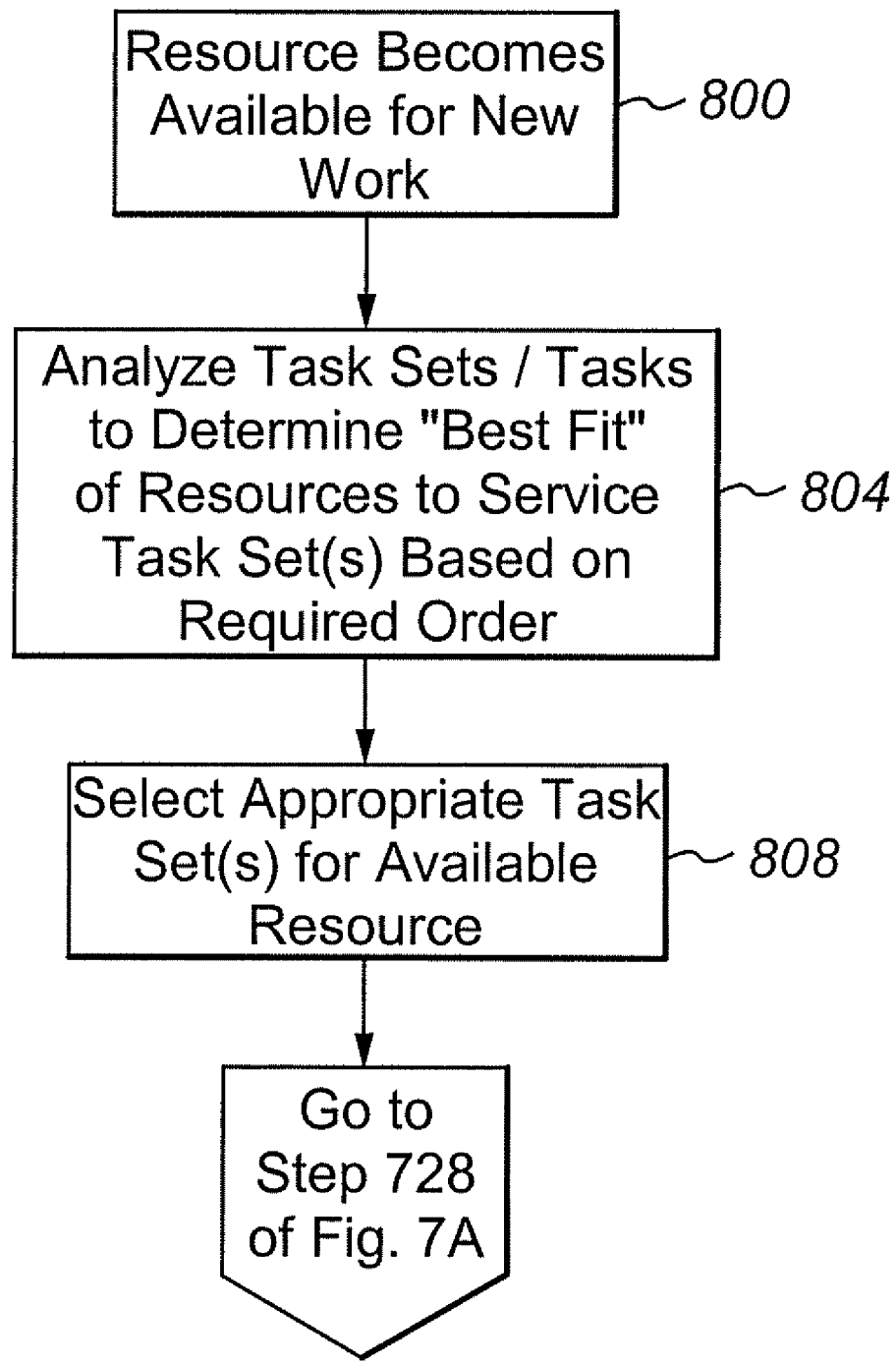
FIG. 8 is a flow schematic of an agent and contact selector according to an embodiment of the present invention.

Turning to FIG. 8, the assignment of task set(s) to an available resource will now be discussed.

In step 800, a resource in a skill queue 212 becomes available to service a new work item.

In step 804, the agent and contact selector 220 analyzes the queued contacts/task set(s) to determine a "best fit" for the resource; that is, which work item is best for the agent and which agent is best for the work item. Additionally, in step 808, based on the results of the analysis in step 804 an appropriate work item or set of work items is selected for delivery to the available resource. What work item is a best fit can be dependent on many factors, including the number and hierarchical ordering of queued task set(s) associated with a contact, the skill level(s) of the available resource, the type of work items waiting to be serviced in each of the queues into which the resource is logged, the identities (e.g., values) of the customers associated with the work items, the potential business revenue associated with each of the work items, each queue's and/or work item's status (or degree of compliance or noncompliance with contact center policies and objectives), target and actual service levels of each queue, actual, expected, and/or predicted wait times associated with various work items and/or queues, and target and actual match rates for each queue. A preferred objective of the contact center is to service as many as possible of the task sets using a single or common resource. A resource capable of servicing only one task set is commonly used only as a last resort. By way of example, if the available agent is a single-skilled agent and the work item at the head of the agent's queue is a task set having related task sets in other queues, the selector 220 may elect to select a work item deeper into the queue because the selector 220 has determined that a multi-skilled agent, capable of servicing not only the work item at the head of the queue but also the related task sets in other queues, will soon be available. Conversely, if the available agent is a multi-skilled agent and the work item at the head of the queue has no related task sets in other queues but a work item deeper in the queue is a task set having related task sets in other queues that the available agent is skilled to handle, the selector 220 may select the work item deeper in the queue and the related task sets for delivery to the agent. By way of illustration and with reference to FIG. 6, the selector 220 may elect to assign the first and second task sets in queues 208*b* and *c* to a common multi-skilled agent for servicing rather than selecting the unrelated work items shown as being at the head of each queue.

In one exemplary configuration, the selector 220 uses expected or predicted wait time to estimate when a multi-skilled agent will be available to service multiple task sets from the same contact versus assigning the various task sets to different single-skilled agents. If the expected or predicted wait time is less than a selected threshold (e.g., a service objective time), the selector 220 awaits the availability of the multi-skilled agent and assigns another work item to the available single-skilled agent. If the expected or predicted wait time is more than the selected threshold, the selected task set is assigned to the single-skilled agent. In one variation, the customer is notified of the options to have a number of the task sets serviced by a multi-skilled agent if the customer waits the expected or predicted wait time or to have a single-skilled agent service one of the task sets immediately. The customer is free to choose one of the two options.

Figure 7A:
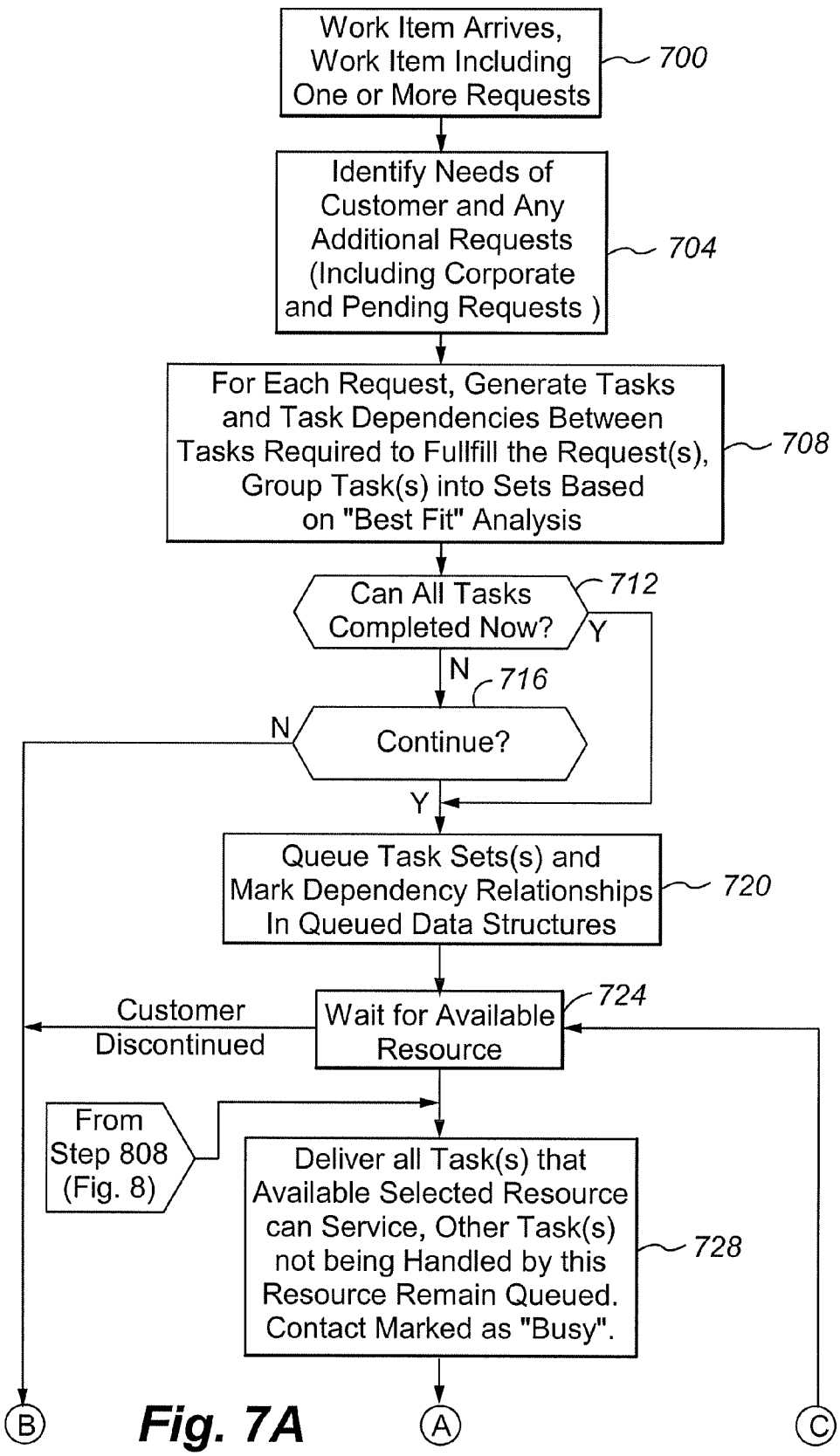
FIGS. 7A and 7B is a flow schematic of a task expert module and an agent and contact selector according to an embodiment of the present invention.
Figure 7B:
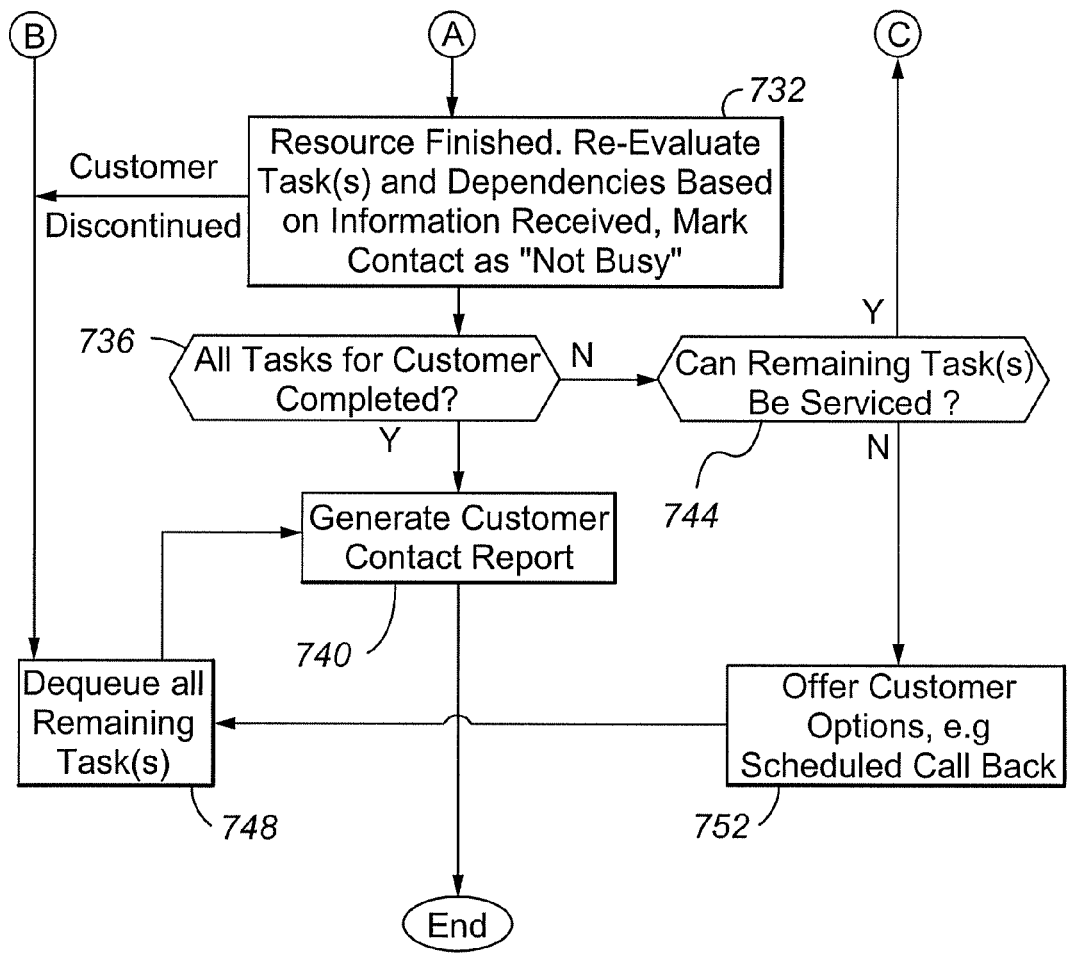

The selector 220 then proceeds to step 728 of FIG. 7A discussed above.

A number of variations and modifications of the invention can be used. It would be possible to provide for some features of the invention without providing others.

For example in one alternative embodiment, the queued data structures are configured to be the contact with a pointer to a corresponding task set to be serviced. In this configuration, a contact would simultaneously be queued in multiple skill queues, with each occurrence of the contact having a pointer to a differing set of tasks.

In other embodiments, the concepts of the present invention apply to face-to-face contacts or interactions in addition to real-time contacts (e.g., instant messaging, live voice calls, Web-based interactions, and the like) and non-real-time contacts (e.g., email), and can include servicing resources other than human agents (e.g., automated response units and Web servers).

In a further embodiment, a work item queue corresponds to multiple skills. In this configuration, multiple task sets associated with a common contact would be queued in different positions in the queue with a skill indicator in the queued data structures. The skill indicator indicates the skill needed to service the corresponding task set. Typically, the task sets are placed in queue positions based upon their associated hierarchies. For example, a task set with a dependency field value of "0" is placed in a position closer to the head of the queue than a task set with a dependency field value of "1" or higher.

In other embodiments, wherein the first and/or second queued task sets are modified based on the result of a completed task set in one or more of the following ways: a dependency of the first and/or second queued task set is changed, a priority of the first and/or second queued task set is changed, a task member of the first and/or second queued task set is eliminated, a task member of the first and/or second queued task set is added, and a queue assignment of the first and/or second task set is changed.

In another embodiment, a servicing human agent can view currently queued task sets corresponding to a contact being serviced by the agent.

In another embodiment, while a human agent is servicing a first task set, the servicing human agent can create a new task member for a second queued task set and/or a new third task set that is immediately queued upon creation.

In yet another embodiment, while a human agent is servicing a first task set but not a second task set, the servicing human agent can modify the data structures representing the second task set prior to the completion of servicing of the first task set.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing work items, comprising:
a processor receiving a single contact from a customer;
the processor identifying a plurality of tasks associated with the single contact;
the processor grouping the tasks into first and second task sets;
the processor queuing the first and second task sets at different positions in at least one queue; and
the processor assigning the first task set to a first agent for servicing while maintaining the second task set in the at least one queue, wherein the second task set is serviced after servicing of the first task set is completed.

2. The method of claim 1, wherein the first and second task sets correspond to different first and second agent skills, respectively, wherein a first queue corresponds to the first agent skill and a second queue corresponds to the second agent skill, and wherein the first task set is in the first queue and the second task set is in the second queue.

3. The method of claim 1, wherein the second task set progresses through the at least one queue while the first task set is being serviced.

4. The method of claim 1, wherein the first task set must be serviced before the second task set, wherein the second task set arrives at a head of the second queue before the first task set arrives at the head of the first queue, and further comprising:
holding the second task set at the head of the second (and subsequent) queue(s) without assigning the second task to a second agent for servicing until the first task set is serviced by the first agent.

5. The method of claim 1, wherein, after the processor assigning the first task set to a first agent for servicing while maintaining the second task set in the at least one queue, marking the first task set, but not the second task set, as completed.

6. The method of claim 1, wherein first and second sets of data structures define the first and second task sets, each of the first and second sets of data structures comprising a dependency field defining a servicing hierarchy for the first and second task set, and wherein the dependency field of the first task set has a different value than a dependency field of the second task set indicating that the first task set is to be serviced before the second task set.

7. The method of claim 6, wherein the first set of data structures comprises a reference to the second set of data structures and vice versa and wherein each of the first and second subsets of data structures comprise a reference to the common contact.

8. The method of claim 7, wherein the first agent is selected to service the first task set to maximize a number of tasks in the first task set.

9. The method of claim 1, wherein, while the first task set is being serviced, the single contact is marked as "busy" and while the first and second task sets are not being serviced, the single contact is marked as "not busy".

10. A computer readable medium comprising processor executable instructions to perform the steps of claim 1.

11. A contact center, comprising:
an input operable to receive a single contact from a customer;
a task expert module operable to
identify two or more requests associated with the single contact;
identify one or more tasks associated each of the requests;
group the tasks into first and second task sets; and
queue the first and second task sets at different positions in at least one queue, wherein the first task set is completed before the second task set is started; and
an agent and work item selector operable to assign the first task set to a first agent for servicing while maintaining the second task set in the at least one queue.

12. The contact center of claim 11, wherein the first and second task sets correspond to different first and second agent skills, respectively, wherein the at least one queue is first and second queues, the first queue corresponding to the first agent skill and the second queue corresponding to the second agent skill, and wherein the first task set is in the first queue and the second task set is in the second queue.

13. The contact center of claim 11, wherein the second task set progresses through the at least one queue while the first task set is being serviced.

14. The contact center of claim 11, wherein the first task set must be serviced before the second task set, wherein the second task set arrives at a head of the second queue before the first task set arrives at the head of the first queue, and wherein the selector is further operable to hold the second task set at the head of the second queue without assigning the second task to a second agent for servicing until the first task set is serviced by the first agent.

15. The contact center of claim 11, wherein, after servicing of the first task set, marking the first task set, but not the second task set, as completed.

16. The contact center of claim 11, wherein first and second sets of data structures define the first and second task sets, each of the first and second sets of data structures comprising a dependency field defining a servicing hierarchy for the first and second task set, and wherein the dependency field of the first task set has a different value than a dependency field of the second task set indicating that the first task set is to be serviced before the second task set.

17. The contact center of claim 16, wherein the first set of data structures comprises a reference to the second set of data structures and vice versa and wherein each of the first and second subsets of data structures comprise a reference to the single contact.

18. The contact center of claim 11, wherein the agent and work item selector preferentially selects those agents able to service multiple related task sets and wherein the task expert module is operable, after the first task set is serviced, to change a value of the second dependency field to be the same as the value of the first dependency field and wherein, while the first task set is being serviced, the single contact is marked as "busy" and while the first and second task sets are not being serviced, the single contact is marked as "not busy".

19. A non-transitory computer readable medium, comprising:
  a plurality of sets of data structures, each set of data structures defining a corresponding work item skill queue, wherein:
    each set of data structures further defining a plurality of queue positions in the corresponding skill queue, each queue position being associated with a different work item,
    first and second queues comprise first and second work items in first and second queue positions, respectively,
    the first and second work items correspond to first and second task sets, respectively,
    the first and second work items correspond to a single contact from a customer, and wherein first and second subsets of data structures defining the first and second work items each comprise a dependency field defining a servicing hierarchy for the first and second work items, and
    the dependency field of the first work item has a different value than a dependency field of the second work item indicating that the first work item is to be completely serviced before the second work item.

20. The computer readable medium of claim 19, wherein the first subset of data structures comprises a reference to the second subset of data structures and vice versa.

21. The computer readable medium of claim 19, wherein each of the first and second subsets of data structures comprise a reference to the single contact.

22. The method of claim 1, wherein the first and/or second queued task sets are modified based on the result of a completed task set in one or more of the following ways: a dependency of the first and/or second queued task set is changed, a priority of the first and/or second queued task set is changed, a task member of the first and/or second queued task set is eliminated, a task member of the first and/or second queued task set is added, and a queue assignment of the first and/or second task set is changed.

23. The method of claim 1, wherein a servicing human agent can view currently queued task sets corresponding to a single contact being serviced by the agent.

24. The method of claim 1, wherein a human agent is currently servicing the first task set and wherein the servicing human agent can create a new task member for the second queued task set and/or a new third task set that is immediately queued upon creation.

25. The method of claim 1, wherein a human agent is currently servicing the first task set but not the second task set and wherein the servicing human agent can modify the second task set prior to the completion of servicing of the first task set.

\* \* \* \* \*

UNITED STATES PATENT AND TRADEMARK OFFICE
CERTIFICATE OF CORRECTION

PATENT NO. : 7,936,867 B1  
APPLICATION NO. : 11/464737  
DATED : May 3, 2011  
INVENTOR(S) : Deborah Jeanne Hill et al.

Page 1 of 1

It is certified that error appears in the above-identified patent and that said Letters Patent is hereby corrected as shown below:

In the Claims:

At Column 16, Claim 11, line 31, after "operable to" please insert --:-- therein.

At Column 16, Claim 11, line 38, after "in at least one queue," please delete "wherein the first task set is completed before the second task set is started" therein.

At Column 16, Claim 11, line 42, after "at least one queue" please insert --wherein the first task set is completed before the second task set is started-- therein.

Signed and Sealed this
Fifth Day of March, 2013

Teresa Stanek Rea
*Acting Director of the United States Patent and Trademark Office*